US012567052B2

(12) United States Patent
Ogisu

(10) Patent No.: US 12,567,052 B2
(45) Date of Patent: Mar. 3, 2026

(54) MONITORING DEVICE, TRANSACTION PROCESSING APPARATUS, AND MONITORING METHOD

(71) Applicant: Toshiba Tec Kabushiki Kaisha, Tokyo (JP)

(72) Inventor: Takahiro Ogisu, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 248 days.

(21) Appl. No.: 18/322,564

(22) Filed: May 23, 2023

(65) Prior Publication Data

US 2024/0029044 A1 Jan. 25, 2024

(30) Foreign Application Priority Data

Jul. 22, 2022 (JP) ................................. 2022-117332

(51) Int. Cl.
  *G06Q 20/20* (2012.01)
  *G06K 7/10* (2006.01)
  (Continued)

(52) U.S. Cl.
  CPC ....... *G06Q 20/206* (2013.01); *G06K 7/10861* (2013.01); *G06Q 20/208* (2013.01);
  (Continued)

(58) Field of Classification Search
  CPC .. G06Q 20/206; G06Q 20/208; G06Q 20/209; G06Q 30/0238; H04N 23/64; H04N 7/183; G06K 7/10861
  See application file for complete search history.

(56) References Cited

U.S. PATENT DOCUMENTS 9,336,517 B1 * 5/2016 Prasad ............... G06Q 20/3223
10,453,216 B1 * 10/2019 Zelenskiy .............. G06V 20/62
(Continued)

FOREIGN PATENT DOCUMENTS

JP    2016-091486 A    5/2016
JP    2016-099923 A    5/2016
(Continued)

OTHER PUBLICATIONS

Extended European Search Report mailed Sep. 29, 2023 in corresponding European Patent Application No. 23179688.9, 8 pages.
(Continued)

*Primary Examiner* — A. Hunter Wilder
*Assistant Examiner* — Joseph M Mutschler
(74) *Attorney, Agent, or Firm* — Kim & Stewart LLP

(57) ABSTRACT

A monitoring device includes a camera positioned to capture an image of a target area in which an evaluation object is to be placed, and a processor configured to, upon receipt of a first image captured by the camera after placing of the evaluation object in the target area, extract an image of the evaluation object from the first image, calculate a first value indicating a feature of the image of the evaluation object, determine whether the target area is imaged properly based on the first value, and upon determining that the target area is not imaged properly, issue a predetermined notification.

11 Claims, 4 Drawing Sheets

(51) Int. Cl.
  *G06Q 30/0238*      (2023.01)
  *H04N 7/18*       (2006.01)
  *H04N 23/60*      (2023.01)

(52) U.S. Cl.
  CPC ....... *G06Q 20/209* (2013.01); *G06Q 30/0238*
        (2013.01); *H04N 7/183* (2013.01); *H04N*
                *23/64* (2023.01)

(56)         References Cited

U.S. PATENT DOCUMENTS

| | | | |
|---|---|---|---|
| 11,049,094 B2* | 6/2021 | Filler .................... | G06F 3/0486 |
| 2015/0170479 A1 | 6/2015 | Nishino | |
| 2017/0295953 A1 | 10/2017 | Sakata et al. | |
| 2020/0027218 A1* | 1/2020 | Buibas ................. | G06V 40/103 |
| 2020/0210768 A1* | 7/2020 | Turkelson ............. | G06T 7/0002 |
| 2021/0174431 A1 | 6/2021 | Dhankhar | |
| 2022/0051504 A1* | 2/2022 | Van Horn ............ | G07D 7/0043 |

FOREIGN PATENT DOCUMENTS

| | | |
|---|---|---|
| JP | 2021-135620 A1 | 9/2021 |
| JP | 2022-087892 A | 6/2022 |

OTHER PUBLICATIONS

Notice of Reasons for Refusal mailed Sep. 30, 2025 in corresponding Japanese Patent Application No. 2022-117332, 8 pages (with Translation).

\* cited by examiner

CHA    101

MONITORING DEVICE, TRANSACTION PROCESSING APPARATUS, AND MONITORING METHOD

CROSS-REFERENCE TO RELATED APPLICATION(S)

This application is based upon and claims the benefit of priority from Japanese Patent Application No. 2022-117332, filed Jul. 22, 2022, the entire contents of which are incorporated herein by reference.

FIELD

Embodiments described herein relate generally to a monitoring device, a transaction processing apparatus, and a monitoring method.

BACKGROUND

It is known to monitor the behavior of a customer using a camera in a transaction processing system, such as a self-service point-of-sales (POS) terminal and a semi-self-service POS terminal, or an unattended store system, in which the operation for completing a transaction is performed by the customer.

Also, in a conventional POS terminal operated by a store clerk, there is a case where the action of the store clerk is monitored by a camera.

In the case where a camera is used for the action monitoring of the operator as described above, if the imaging state of the camera changes and worsens, there is a possibility that the action monitoring cannot be properly performed.

In view of such circumstances, there is a demand for a system that can detect and report an abnormality in the imaging state of a camera in a timely manner.

SUMMARY OF THE INVENTION

Embodiments of the present invention provide a monitoring device and a transaction processing apparatus capable of detecting and reporting an abnormality in the imaging state of a camera.

A monitoring device in one embodiment includes a camera positioned to capture an image of a target area in which an evaluation object is to be placed, and a processor configured to: upon receipt of a first image captured by the camera after placing of the evaluation object in the target area, extract an image of the evaluation object from the first image, calculate a first value indicating a feature of the image of the evaluation object, determine whether the target area is imaged properly based on the first value, and upon determining that the target area is not imaged properly, issue a predetermined notification.

DETAILED DESCRIPTION

Hereinafter, embodiments will be described in detail with reference to the drawings. In the present embodiment, a self-service checkout device having a function as a monitoring device will be described as an example of a transaction processing apparatus.

Figure 1:
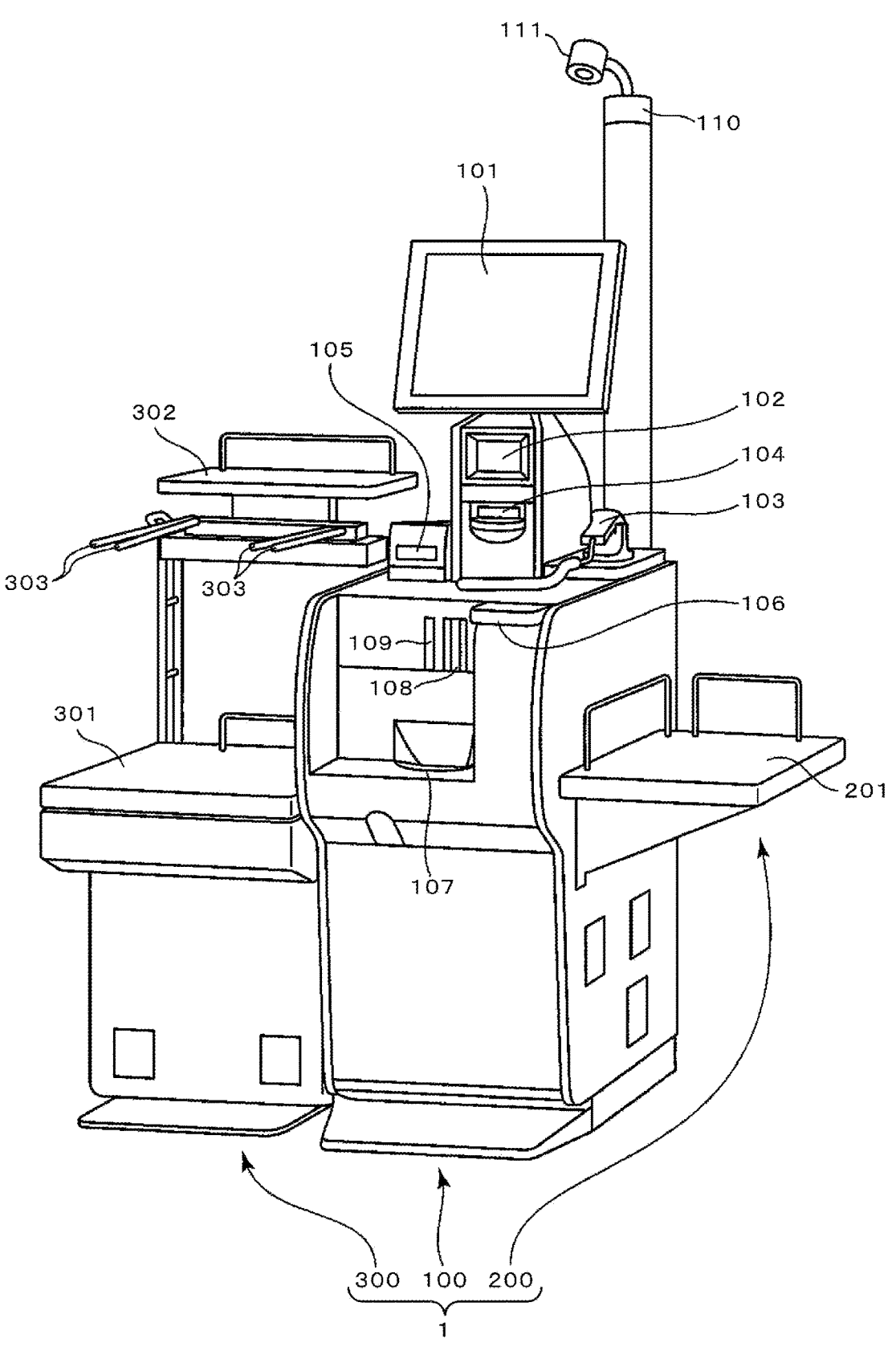
FIG. 1 is a perspective view of a checkout device according to an embodiment.

FIG. 1 is a perspective view of a self-service checkout device 1 according to the present embodiment. The checkout device 1 is also called a self-service POS terminal.

The checkout device 1 includes a main body 100 and weighing units 200 and 300. The main body 100 includes a touch panel 101, a scanner window 102, a handy scanner 103, a receipt issuing port 104, a card insertion port 105, a coin insertion tray 106, a change tray 107, a bill insertion port 108, a bill discharge port 109, an alarm lamp 110, and a monitoring camera 111.

The touch panel 101 displays various screens for notifying an operator of various types of information. A part of the various screens constitutes a graphical user interface (GUI), and the touch panel 101 receives a touch operation made via the GUI. That is, the touch panel 101 includes a display device and an input device.

The scanner window 102 is made of transparent resin, glass, or the like to cover an opening formed in the main body 100. The scanner window 102 allows an item or commodity held by the operator in front of the scanner window 102 to be scanned by a fixed scanner disposed inside the main body 100. The fixed scanner will be described later.

The handy scanner 103 reads a barcode attached to or displayed on an item, and outputs the barcode information represented by the barcode.

The receipt issuing port 104 is a slit-shaped opening for discharging a receipt to the outside of the main body 100.

The card insertion port 105 is a slit-shaped opening for inserting a credit card inserted by the operator into the main body 100 for payment.

The coin insertion tray 106 receives coins inserted by the operator. On the bottom surface of the coin insertion tray 106, an opening is formed through which the coins are taken into the inside of the main body 100.

The change tray 107 receives coins discharged from the main body 100 as change or the like.

The bill insertion port 108 is a slit-shaped opening for taking the bill inserted by the operator into the main body 100.

The bill discharge port 109 is a slit-shaped opening for discharging a bill as change or the like from the main body 100. The bill discharge port 109 holds the bill in a state in which a part of the bill protrudes to the outside of the main body 100.

The alarm lamp 110 performs a lighting operation and a blinking operation for various alarms.

The monitoring camera 111 captures an image of the display surface of the touch panel 101, the handy scanner 103, the receipt issuing port 104, the card insertion port 105, the coin insertion tray 106, the change tray 107, the bill insertion port 108, the bill discharge port 109, and the like from above. The monitoring camera 111 includes an imaging device such as a video camera or a still camera.

The weighing unit 200 comprises a table 201 for placing unregistered items. The weighing unit 200 measures the total weight of the items placed on the table 201.

The weighing unit 300 includes tables 301 and 302 for placing registered items and an arm 303 for hanging a bag for storing registered items. The weighing unit 300 measures the total weight of the items placed on the tables 301 and 302 and the ones stored in the bag hung on the arm 303.

Figure 2:
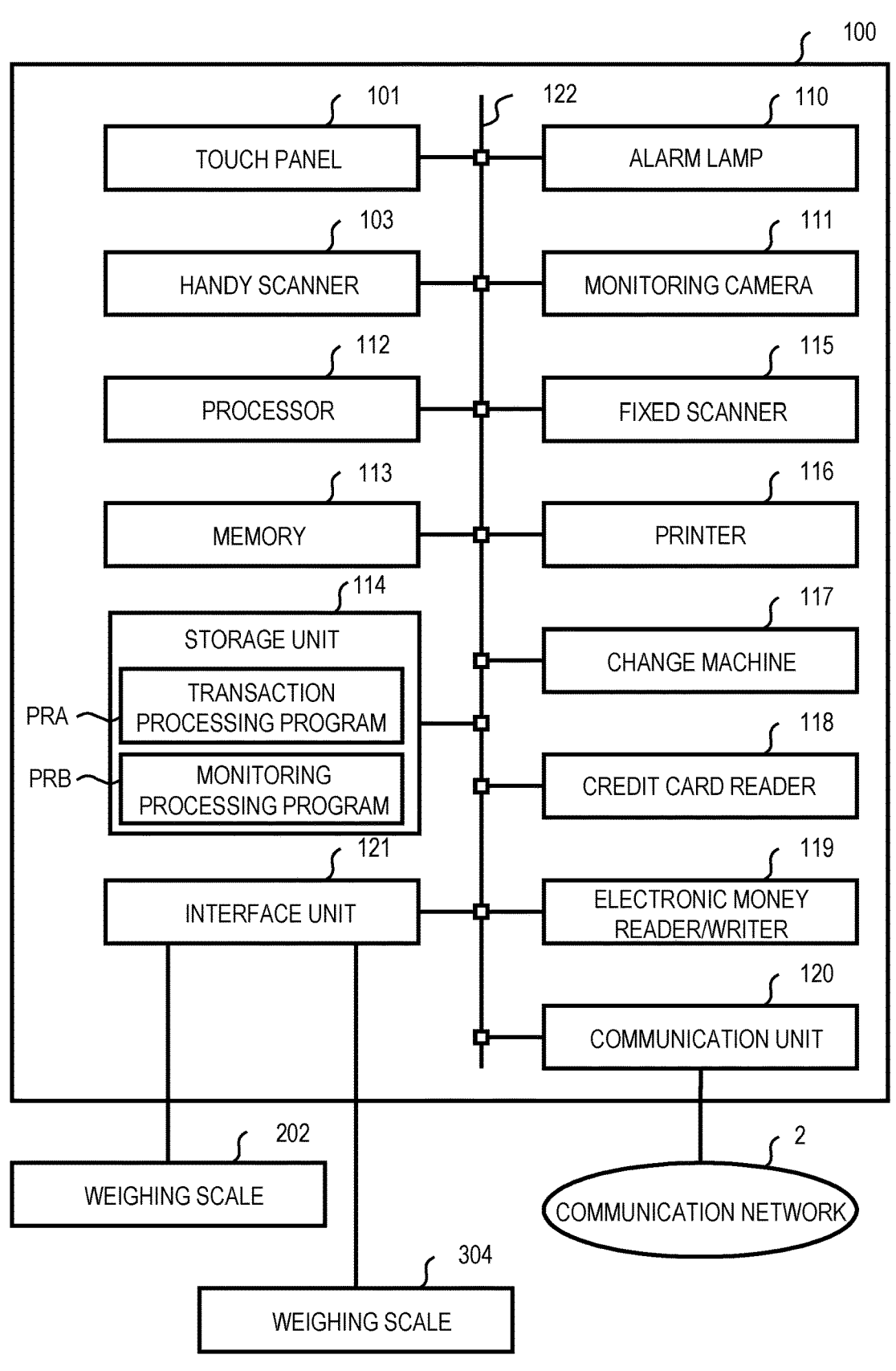
FIG. 2 is a hardware block diagram of the checkout device illustrated in FIG. 1.

FIG. 2 is a hardware block diagram of the checkout device 1. In FIG. 2, the same elements as those shown in FIG. 1 are denoted by the same reference numerals, and the detailed description thereof will not be repeated. The main body 100 includes a processor 112, a memory 113, a storage unit 114, a fixed scanner 115, a printer 116, a change machine 117, a credit card reader 118, an electronic money reader/writer 119, a communication unit 120, an interface unit 121, and a bus 122 in addition to the touch panel 101, the handy scanner 103, the alarm lamp 110, and the monitoring camera 111 described above.

The processor 112, the memory 113, and the storage unit 114 are connected to each other via the bus 122 for controlling the checkout device 1. For example, the processor 112 is a CPU that executes information processing for controlling each unit to perform various functions of the checkout device 1 according to various information processing programs such as an operating system, firmware, and an application program stored in the memory 113 and the storage unit 114.

The memory 113 includes a read-only memory area and a rewritable memory area. In the memory 113, one or more of the information processing programs are stored in the read-only memory area and the rewritable memory area. The rewritable memory area is used as a work area by the processor 10. In some cases, the memory 113 stores data necessary for the processor 112 to execute processing for controlling each unit in the read-only memory area or the rewritable memory area.

The storage unit 114 includes a well-known storage device such as an electric erasable programmable read-only memory (EEPROM), a hard disc drive (HDD), or a solid state drive (SSD). The storage unit 114 stores data used by the processor 112 to perform various types of processing and data generated by the processor 112. The storage unit 114 may also store application programs. In the present embodiment, the storage unit 114 stores a transaction processing program PRA and a monitoring processing program PRB. The transaction processing program PRA is an application program for processing a transaction. The monitoring processing program PRB is an application program for monitoring an action of an operator at the time of the transaction processing.

The transaction processing program PRA and the monitoring processing program PRB are typically stored in the storage unit 114 when the checkout device 1 is transferred. However, the transaction processing program PRA and the monitoring processing program PRB may be installed into the storage unit 114 after the transfer of the checkout device 1. The transaction processing program PRA and the monitoring processing program PRB can be stored in and installed from a non-transitory computer readable recording medium such as a magnetic disk, a magneto-optical disk, an optical disk, a semiconductor memory, or the like, or an external computer connected to a network such as the Internet.

The fixed scanner 115 captures an image of an item held in front of the scanner window 102, and then reads the barcode attached to or displayed on the item by image processing. The fixed scanner 115 outputs the information represented by the barcode to the processor 112. It should be noted that the fixed scanner 115 may use other types of well-known devices that use reflection of laser light to read barcodes.

The printer 116 includes a receipt printer and a journal printer. The receipt printer prints various types of information on a receipt sheet such as a transaction receipt indicating the detail of a commercial transaction and a credit card receipt related to credit card settlement. The receipt issued by the receipt printer is discharged from the receipt issuing port 104 to the outside of the main body 100. The journal printer prints journal data including information printed on the receipt paper by the receipt printer on the journal sheet. The journal sheet is retained inside the main body 100 unless it is taken out by a maintenance person.

The change machine 117 includes a coin storage for storing coins by denomination, and a bill storage for storing bills by denomination. Then, the change machine 117 takes in coins inserted into the coin insertion tray 106, identifies the denomination, and stores the coins in the coin storage according to the denomination. The change machine 117 takes in bills inserted into the bill insertion port 108, identifies the denomination, and stores the bills in the bill storage by the denomination. The change machine 117 discharges the coins or bills stored in the coin storage or the bill storage from the change tray 107 or the bill discharge port 109 in response to a payment instruction from the processor 112. As such a change machine 117, a well-known automatic change machine can be applied.

The credit card reader 118 reads data recorded in the credit card inserted by an operator into the card insertion port 105.

The electronic money reader/writer 119 includes, for example, a near field communication (NFC) unit, and reads data from a nearby electronic money card by wireless communication. The electronic money reader/writer 119 writes data from a nearby electronic money card by wireless communication.

The communication unit 120 is a communication interface circuit that performs data communication via the communication network 2. The communication network 2 is, for instance, a local area network (LAN). As the communication unit 120, if the communication network 2 is a LAN, a known communication device adapted to LAN can be used.

A weighing scale 202 included in the weighing unit 200 and a weighing scale 304 included in the weighing unit 300 are connected to the interface unit 121, respectively. The weighing scale 202 measures the total weight of the items placed on the table 201, and outputs the total weight as a weighing value. The weighing scale 304 measures the total weight of the item placed on the tables 301 and 302 and the item placed in the bag hung on the arm 303, and outputs the total weight as a weighing value. The interface unit 121 acquires the weighing values output from the weighing scales 202 and 304.

The bus 122 includes an address bus, a data bus, a control signal line, and the like. Data and signals are transmitted and received between the connected units through the bus 122.

Next, the operation of the checkout device 1 configured as described above will be described. Note that the processing described below is an example, and the order of the steps may be changed, one or more of the steps may be omitted, and another step may be added as appropriate.

The checkout device 1 is mainly operated by a customer. The checkout device 1 performs a registration process for registering an item in a transaction and a checkout process related to payment of a price related to the registered item in response to an operation by an operator, and completes the transaction.

When the checkout device 1 is activated in an operating condition for processing such a transaction, the processor

112 starts information processing according to the transaction processing program PRA (hereinafter, referred to as transaction processing) and information processing based on the monitoring processing program PRB (hereinafter, referred to as monitoring processing). The processor 112 concurrently executes the transaction processing and the monitoring processing using multiple threads, for example.

Figure 3:
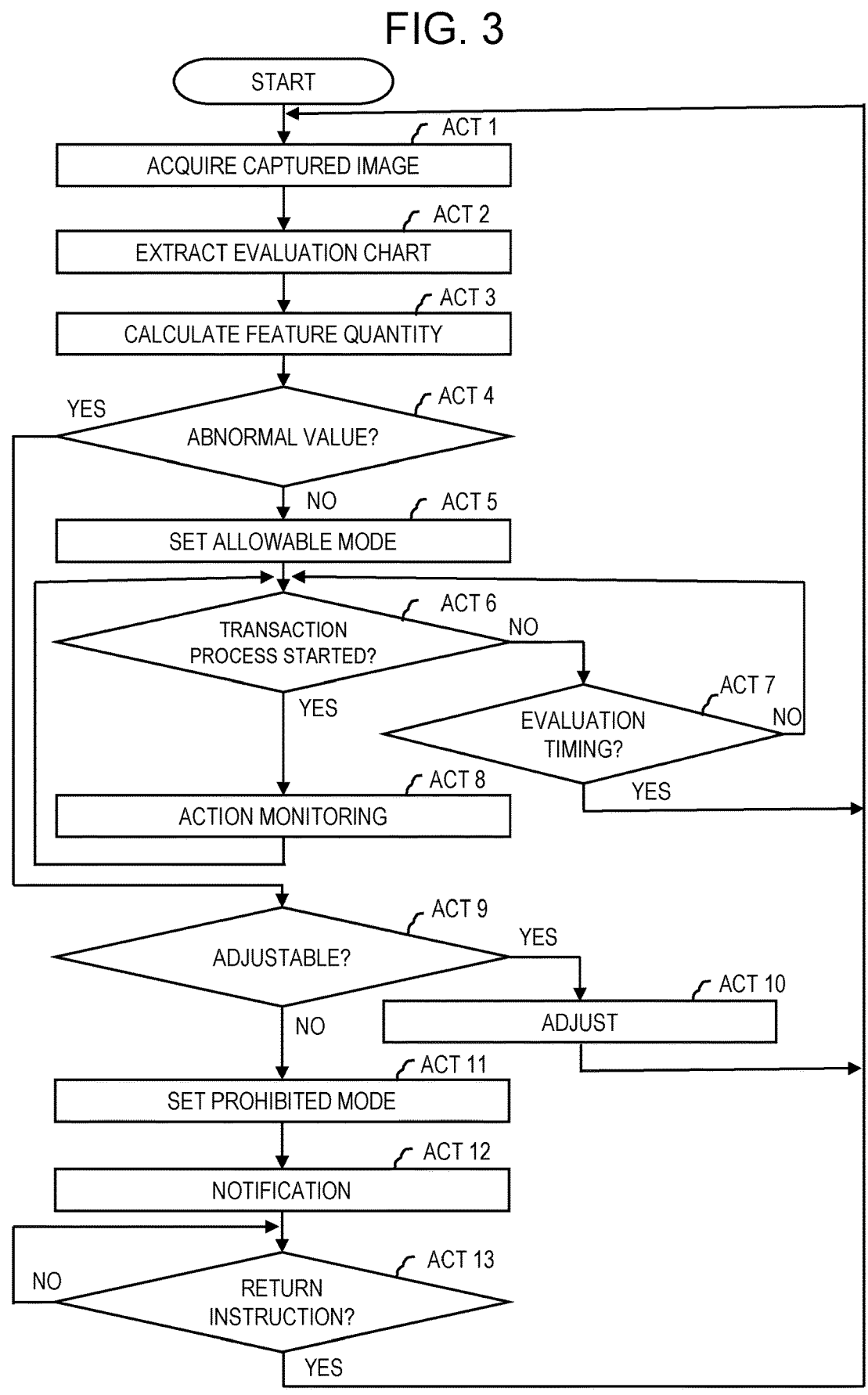
FIG. 3 is a flowchart of a monitoring process according to an embodiment.

FIG. 3 is a flowchart of the monitoring process. In ACT 1, the processor 112 acquires an image captured by the monitoring camera 111.

In ACT 2, the processor 112 identifies and extracts an evaluation chart shown in the acquired image.

The evaluation chart is an object, an image of which is captured by the monitoring camera 111. In the present embodiment, a triangular chart formed in a predetermined color on the upper surface of the housing of the touch panel 101 is used.

Figure 4:
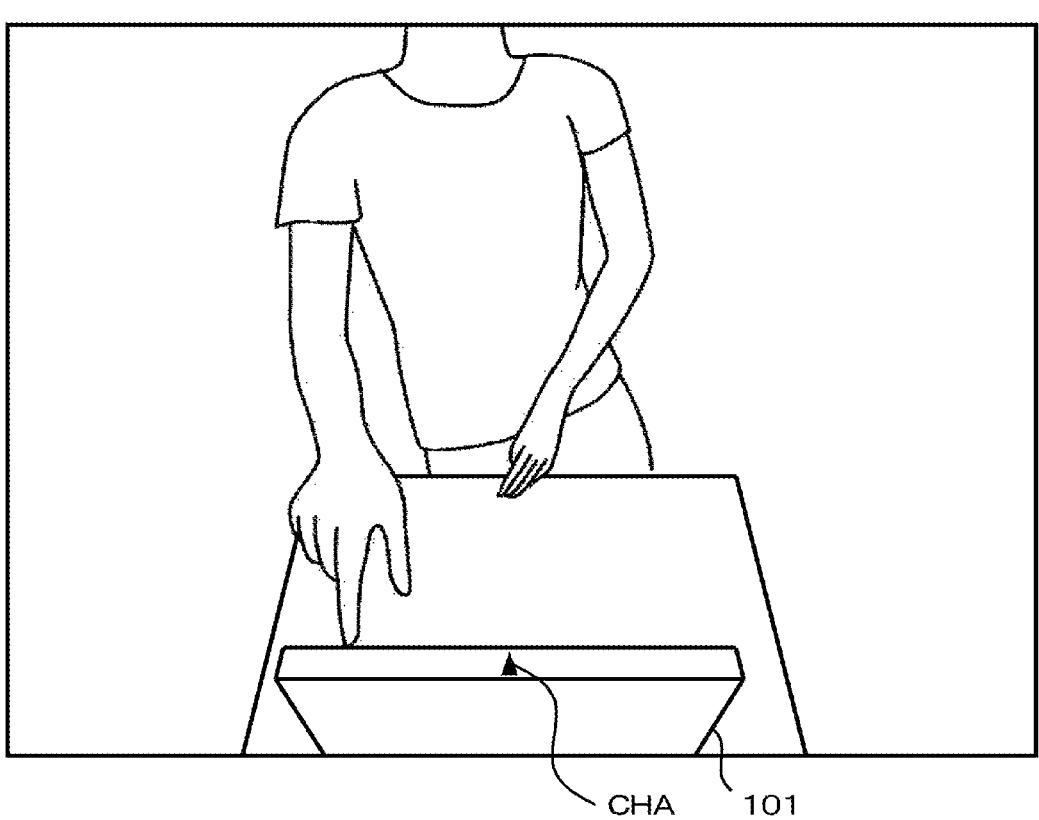
FIG. 4 depicts an image captured by a monitoring camera shown in FIGS. 1 and 2.

FIG. 4 is a diagram illustrating an example of the image captured by the monitoring camera 111. In FIG. 4, the items imaged by the monitoring camera 111 are not illustrated.

When the monitoring camera 111 is in the ideal condition, as shown in FIG. 4, the evaluation chart CHA is fully imaged by the monitoring camera 111.

Then, the processor 112 extracts the evaluation chart CHA from the image based on the shape and the color.

In ACT 3, the processor 112 calculates the feature quantities for each of predetermined evaluation items with respect to the evaluation chart CHA. Examples of the evaluation items include a position, a size, an inclination, a color, a brightness, and the like of the image of the evaluation chart CHA. For example, a provider or an administrator of the checkout device 1 may determine as appropriate which feature quantities are calculated by the processor 112 in ACT 3.

In ACT 4, the processor 112 checks whether there is an abnormal value in the calculated feature quantities. For example, the processor 112 determines whether each of the feature quantities calculated in ACT 3 is abnormal in light of a predetermined condition for the respective evaluation items. For example, the processor 112 calculates a coordinate value as a feature quantity relating to the position of the evaluation chart CHA within the image, and determines that the feature quantity relating to the position is an abnormal value when the coordinate value is outside a predetermined allowable area in the image. For example, when the evaluation chart CHA cannot be imaged and the position of the evaluation chart CHA in the images cannot be specified, the processor 112 determines that the feature quantity related to the position is an abnormal value. For example, the processor 112 calculates the average brightness in the evaluation chart CHA as the feature quantity relating to the brightness of the evaluation chart CHA, and determines that the feature quantity relating to the brightness is an abnormal value when the brightness is outside a predetermined allowable range. The determination condition may be appropriately determined by, for example, a provider or an administrator of the checkout device 1.

As described above, the processor 112 performs ACT 1 to ACT 4 to evaluate whether the imaging state of the monitoring camera 111 is in an intended imaging state using the evaluation chart CHA. Note that the imaging status of the monitoring camera 111 is adjusted so as to be suitable for action monitoring, which will be described later, at the time of installation of the checkout device 1, at the time of maintenance, or the like. If the imaging state is properly adjusted and no major changes have occurred, no abnormal value will occur.

The processor 112 is determined to be NO in ACT 4 if there is no single abnormal value and proceeds to ACT 5.

In ACT 5, the processor 112 sets the operation mode of the checkout device 1 to an allowable mode.

In the transaction processing, the processor 112 accepts the operation by the operator for starting the transaction when the allowable mode is set, and does not accept such an operation when a prohibited mode to be described later is set. Then, in the transaction processing, if the allowable mode is set, the processor 112 starts processing for registration and checkout for one transaction if the operation is performed by the operator for starting the transaction. The processing executed by the processor 112 for registration and checkout for one transaction in the transaction processing may be the same as the processing executed by the existing same kind of checkout device 1, for example, and therefore, the description thereof will be omitted here.

In ACT 6, the processor 112 checks whether a process related to a transaction has been started in the transaction process. The processor 112 determines NO if the corresponding event cannot be confirmed, and proceeds to ACT 7.

In ACT 7, the processor 112 checks whether the evaluation timing has been reached. The processor 112 then determines NO if the event cannot be ascertained and returns to ACT 6.

Thus, the processor 112 waits in ACT 6 and ACT 7 for a transaction to be processed or the evaluation timing.

The evaluation timing is determined by, for example, a provider or an administrator of the checkout device 1. As an example, the processor 112 determines that the evaluation timing is reached when the elapsed time from the previous evaluation in ACT 1 to ACT 4 exceeds a predetermined time. Alternatively, as an example, the processor 112 may determine that the evaluation timing is reached when the period during which the transaction processing is not performed exceeds a predetermined time.

If the processor 112 determines that it is the evaluation timing, it determines YES in ACT 7, returns to ACT 1, and performs the evaluation as described above again.

On the other hand, if the processing related to one transaction is started in the transaction processing, the processor 112 determines YES in ACT 6 in the monitoring processing, and proceeds to ACT 8.

In ACT 8, the processor 112 performs action monitoring. The action monitoring is a process for monitoring the action of the operator based on the image captured by the monitoring camera 111. The action monitoring is implemented, for instance, as an AI process. It should be noted that the condition to be applied in ACT 4 is preferably determined so that the feature quantity that lowers the accuracy of the action monitoring here is an abnormal value. When the processing related to one transaction is terminated in the transaction processing, the processor 112 terminates the action monitoring and returns to the standby status of ACT 6 and ACT 7.

Now, the imaging state of the monitoring camera 111 may change. The cause of this change can be the monitoring camera 111, and the change can happen when the direction of the monitoring camera 111 is changed, or when the lens of the imaging device included in the monitoring camera 111 is dirty, for example. Further, the cause of the change can be the surrounding environment, such as a case where the brightness of the store lighting changes. If the imaging state of the monitoring camera 111 is greatly changed, an abnormal value may be generated in the feature quantity obtained by evaluating in ACT 1 to ACT 4. Then, if an abnormal value has occurred in this way, the processor 112 determines YES in ACT 4, and proceeds to ACT 9. At this time, the processor 112 determines an abnormality in the imaging state of the monitoring camera 111.

In ACT 9, the processor 112 checks whether the abnormal value of the evaluation item can be adjusted. For example, if the imaging device included in the monitoring camera 111 has an aperture adjustment function, it is possible to adjust the brightness. For example, if the monitoring camera 111 includes a mechanism for changing the shooting direction, the position can be adjusted. The processor 112 proceeds to ACT 10 if the feature quantity related to the evaluation item is adjustable.

In ACT 10, the processor 112 adjusts the imaging state (e.g., parameter setting) of the monitoring camera 111 so as to bring the feature quantity having the abnormal value closer to the normal range. The processor 112 then returns to ACT 1 to re-evaluate the adjustment imaging state.

If the processor 112 is unable to adjust the abnormal value, it determines NO in ACT 9 and proceeds to ACT 11.

In ACT 11, the processor 112 sets the operation mode of the checkout device 1 to the prohibited mode. As a result, the processor 112 does not accept any operations related to a new transaction in the transaction processing.

In ACT 12, the processor 112 performs a notification process. The notification process causes a predetermined notification destination to perform a predetermined notification operation for notifying an abnormality of the monitoring process. The notification operation is, for example, display and ringing at a predetermined terminal. It is assumed that the terminal serving as the notification destination is a portable terminal carried by a store clerk in charge of management of the checkout device 1, an attendant terminal installed in the vicinity of the checkout apparatus 1, or the like. In this case, as the notification process, the processor 112 causes the communication unit 120 to send instruction data instructing execute of the notification operation to the communication network 2 by addressing to the terminal of the notification destination. The notification operation may be, for example, blinking of the alarm lamp 110 in the checkout apparatus 1, displaying a screen on the touch panel 101, or ringing by a ringing device (not shown). In this case, the processor 112 controls those devices in the notification process. What kind of processing is to be performed as the notification process may be appropriately determined by, for example, a provider or an administrator of the checkout device 1.

When an abnormality is recognized by the notification operation, a store clerk or the like performs an action so as to resolve the abnormality. Then, when the relevant treatment is completed, the store clerk or the like performs a predetermined operation on the touch panel 101 to input a return instruction, for example.

In ACT 13, the processor 112 waits for the return instruction. Then, the processor 112 determines YES if an operation for instructing the return is performed as described above, and repeats ACT 1 and subsequent steps.

As described above, the checkout device 1 detects an abnormality of the imaging state of the monitoring camera 111 using the evaluation chart CHA in the image captured by the monitoring camera 111, and causes the notification operation to be performed. As a result, it is possible to notify a store clerk or the like of an abnormality in the imaging state of the monitoring camera 111 to prompt a countermeasure, and it is possible to prevent the abnormality from continuing without being addressed.

In addition, the checkout device 1 attempts adjustment if the evaluation item whose feature quantity is an abnormal value can be adjusted by changing the imaging state of the monitoring camera 111. Therefore, if the normal feature quantity is obtained after the adjustment, the checkout device 1 can continue the operation as it is.

In addition, when there is an abnormality in the imaging state of the monitoring camera 111, the checkout device 1 prohibits execution of processing for a transaction by the transaction processing. In this way, if there is a possibility that the monitoring based on the captured image by the monitoring camera 111 cannot be correctly performed, the transaction processing is not performed, and it is possible to prevent the unauthorized operation from being overlooked.

Various modifications can be made to this embodiment as follows.

The transaction processing and the monitoring processing may be executed by separate processors. In this case, each processor may be provided in another device. That is, the monitoring device may be configured as a device different from the checkout device 1, and the monitoring process may be executed by a processor provided in the monitoring device.

Instead of the evaluation chart CHA, a chart of another form may be used, or an object different from the chart, such as a three-dimensional object, may be used. Alternatively, for example, the upper surface of the touch panel 101 or the like may be used as the evaluation object.

The evaluation of the imaging state of the monitoring camera 111 may be performed only at the start of the monitoring process. Further, the evaluation of the imaging state of the monitoring camera 111 may not be performed at the start of the monitoring process. Further, the evaluation of the imaging state of the monitoring camera 111 may be performed at another timing such as at the start of the monitoring process.

The processes described above can also be implemented in other types of transaction processing apparatuses, such as conventional full-service POS terminals, semi-self-service POS terminals, or processing devices for unattended store systems.

The monitoring target is not limited to the action of the operator for the transaction processing, and may be any type of monitoring as long as the monitoring is performed based on an image acquired by the camera.

The monitoring camera 111 may not be included in the checkout device 1. For example, an image captured by a camera mounted on the ceiling of a store may be used.

Some of the elements included in the checkout device 1 may be omitted. For example, one or both of the weighing units 200 and 300 may not be provided. Further, for example, the weighing units 200 and 300 may be omitted from the weighing scales 202 and 304, and the weighing unit may be simply a placing table.

Each of the functions performed by the processor 112 by the information processing may be performed by hardware that executes information processing that is not based on a program such as a logic circuit or the like. Each of the above-described functions can also be performed by combining software control with hardware such as the above-described logic circuit.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A point of sale (POS) terminal installed in a store, comprising:

an input device, a symbol formed on a surface of the POS terminal, a camera positioned to capture an image of a target area in which the input device and the symbol are located, and a processor configured to switch an operation mode of the POS terminal between a first mode in which an operation for starting a sales transaction through the input device is allowed and a second mode in which the operation is prohibited, wherein the processor is further configured to:

upon receipt of a first image captured by the camera, extract an image of the symbol from the first image, calculate a first value indicating a feature of the image of the symbol, the feature including at least one of: a size, an inclination, a color, and a brightness of the image and a position of the image within the first image, determine whether the target area is imaged properly based on the first value, upon determining that the target area is imaged properly, set the operation mode to the first mode, and upon determining that the target area is not imaged properly, set the operation mode to the second mode.

2. The POS terminal according to claim 1, wherein the processor is configured to, in response to determining that the target area is not imaged properly, issue a predetermined notification.

3. The POS terminal according to claim 1, wherein the processor is configured to, in response to determining that the target area is not imaged properly, control the camera to change a parameter setting.

4. The POS terminal according to claim 3, wherein the processor is configured to, after the parameter setting is changed:

control the camera to capture a second image of the target area, extract another image of the symbol from the second image, calculate a second value indicating a feature of said another image of the symbol, determine whether the target area is imaged properly based on the second value, and upon determining that the target area is not imaged properly, maintain the second mode.

5. The POS terminal according to claim 4, wherein the processor is configured to, in response to determining that the target area is imaged properly, set the operation mode to the first mode.

6. The POS terminal according to claim 1, wherein the input device is a touch display, and the symbol is formed on a housing of the touch display to which the evaluation object is attached.

7. The POS terminal according to claim 6, wherein the processor is configured to, in response to determining that the target area is not imaged properly, control the display device to output a predetermined notification.

8. The POS terminal according to claim 1, further comprising:

a communication interface configured to communicate with a terminal operated by a store clerk, wherein the processor is configured to, in response to determining that the target area is not imaged properly, control the communication interface to transmit a predetermined notification to the terminal.

9. The POS terminal according to claim 1, wherein the processor is configured to, in response to determining that the target area is imaged properly, control the camera to change at least one of: an aperture setting and an orientation of the camera.

10. The POS terminal according to claim 1, wherein the POS terminal is a self-service POS terminal operated by a customer of the store, and the processor is configured to evaluate images captured by the camera to monitor a person present in the target area.

11. A method performed by a point of sale (POS) terminal installed in a store, the method comprising:

capturing an image of a target area in which an input device of the POS terminal and a symbol formed on a surface of the POS terminal are located;

extracting an image of the symbol from the captured image;

calculating a first value indicating a feature of the image of the symbol, the feature including at least one of: a size, an inclination, a color, and a brightness of the image and a position of the image within the captured image;

determining whether the target area is imaged properly based on the first value;

upon determining that the target area is imaged properly, setting an operation mode of the POS terminal to a first mode in which an operation for starting a sales transaction through the input device is allowed; and upon determining that the target area is not imaged properly, setting the operation mode to a second mode in which the operation is prohibited.

* * * * *